Patented Feb. 20, 1951

2,542,542

UNITED STATES PATENT OFFICE 2,542,542

LUBRICATING OIL ADDITIVES

Samuel B. Lippincott and Louis A. Mikeska, Westfield, N. J., assignors to Standard Oil Development Company, a corporation of Delaware No Drawing. Application August 2, 1948, Serial No. 42,154

1 Claim. (Cl. 252—56)

This invention relates to novel chemical copolymer products and to processes for preparing and using the same. It relates further to oil compositions containing such products. More particularly it relates to high molecular weight copolymers of unsaturated dibasic acids and their derivatives with other olefinic substances and also to their use in oil compositions as lubricants and the like. These novel copolymers are especially usable for improving the pour point, viscosity index, and other properties of mineral base lubricating oils and the like.

One object of the present invention is the production of pour depressants of high potency in a wide variety of lubricating oils. Another object is to produce pour depressants having good pour stability under conditions of winter field storage. A further object is the production of a good lubricating oil additive which not only lowers the pour point but also increases the viscosity index of the oil so that the additive is not only a good pour depressant when used in small amounts but will also be an effective pour depressant when used in higher concentrations as a viscosity index improver. The utility of the invention is not limted to hydrocarbon oils as the improved copolymers are useful also in synthetic oils and related products.

Broadly, the present invention comprises the production of copolymers of ethylene-1,2-dicarboxylic acids and their derivatives such as maleic acid, fumaric acid, citraconic acid, mesaconic acid, glutaconic acid and the like, their anhydrides, or other derivatives and an olefin that contains a long chain of carbon atoms. It is also contemplated to use unsaturated dicarboxylic acids where the double bond has moved from the 1,2 position, for example, itaconic acid. The olefin compound usable in the copolymerization with maleic acid and its derivatives are ordinary olefins containing from 8 to 24 straight chain carbon atoms. Among these olefinic materials are octene, decene, dodecene, hexadecene, octadecene and the like.

In preparing the copolymers of the present invention, approximately equimolar quantities of the unsaturated dibasic acid derivatives and the olefin are used. Peroxide catalysts are generally preferred. The reactants are generally charged in a flask with a diluent and a catalyst and heated to approximately 100 to 200° C. for a period of about two hours.

During the copolymerization, it is preferred to exclude oxygen and air by any suitable means such as by blowing the reaction mixture or the reaction vessel with an inert gas such as nitrogen or carbon dioxide or displacing the air with the vapors of a refluxing solvent.

The copolymers of this invention may be used in concentrations ranging from about 0.05% to 5% or more; preferably from 0.01 to 0.5% is used when pour depressing is the primary object. A larger concentration, for example, 0.5% to 10% may be used when viscosity index improvement is the primary object. It is contemplated that the copolymers may be used directly or may be neutralized by forming a metallic, ammonium or amide salt of the copolymer. The oil base stocks in which the copolymers may be used may range from paraffinic oils which require pour depressants, naphthenic or mixed lubricating oils which are to be improved with respect to viscosity index. Synthetic oils also may be improved by the product of this invention. The copolymers may also be used in greases which contain metal salts or in paraffin wax or waxy compositions or in lighter liquid hydrocarbon oil products such as Diesel fuel base stock which are often higher paraffinic in nature and require pour depressants or other additive material to facilitate their use. Copolymers may be used with other light oils such as domestic heating oil base stock, mineral seal oil, refined kerosene and the like. It is also contemplated that certain of these copolymers may be used directly as lubricating oils in their own right.

In preparing the lubricating oils or other compositions containing the novel copolymers of this invention, one may also add other conventional additives such as dyes, anti-oxidants, or other types of pour depressants such as the wax-naphthalene condensation product in common commercial use as well as other viscosity index improvers such as polybutene, polyacrylates, and the like.

The invention will be better understood from a consideration of the following examples:

EXAMPLE 1

A flask was charged with 49 grams of maleic anhydride (½ mol), 126 grams of 1-actadecene (½ mol) and 150 ml. of benzene. The mixture was heated to boiling (about 103° C.) and 3 grams of benzoyl peroxide in 50 ml. of benzene was added over a period of 5½ hours. The temperature of the boiling reaction mixture dropped from 103° C. to 92° C. Refluxing was continued for ½ hour after the addition of the catalyst was complete. The solvent was recovered by heating the mixture to 200° C. at atmospheric pressure and the product was then concentrated further by heating to 200° C. at 1–2 mm. pressure. The resulting product (150 g.) was a brittle glass-like resin, light yellow in color. Analyses (73.40% C, 10.31% H) indicated that the copolymer was made up of maleic anhydride units and octadecene units in a molar ratio of about 1.25. It was blended with Test oil A and the following pour point data were obtained. Test oil A is a solvent extracted Mid-Continent neutral plus 3½% Pennsylvania Bright Stock having an SAE grade of 10. Test oil B is a solvent extracted Mid-Continent neutral having an SAE grade of 10. The S. O. D. Pour Stability test is described in the Transaction of the Society of Automotive Engineers, vol. II, No. 1 pp. 34–44.

TABLE I

| Conc., Per Cent | A. S. T. M. Pour Point, °F. | S. O. D. Pour Stability Cycle A, Solid Point, °F. |
|---|---|---|
| 0 | +30 | +20 |
| 0.2 | −10 | −20 |
| 0.25 | −20 | |
| 0.5 | −25 | |
| 1.0 | −30 | |

EXAMPLE 2

The experiment of Example 1 was repeated using a mol ratio of olefin to maleic anhydride of 2 instead of 1. The product (165 g.) was very much like that obtained in Example 1. The carbon and hydrogen content of the copolymer (74.34% C, 11.04% H) indicates that the two monomers copolymerized at a molar ratio of 1.

TABLE II

*In test oil A*

| Conc., Per Cent | A. S. T. M. Pour Point, °F. | S. O. D. Pour Stability Cycle A, Solid Point, °F. |
|---|---|---|
| 0 | +30 | +20 |
| 0.2 | −20 | −20 |
| 0.25 | −10 | |
| 0.5 | −30 | |
| 1.0 | −30 | |

EXAMPLE 3

In this experiment, the molar ratio of olefin to maleic anhydride was increased to 4. Octadecene was again used as the olefin. The product (178 g.) was a tougher, less brittle, resin than that obtained in either of the other experiments described above. The product analyzed 75.58% carbon and 11.60% hydrogen. This indicates a molar ratio of maleic anhydride to octadecene in the copolymer of about 0.9. Pour point data below:

TABLE III

*In test oil A*

| Conc., Per Cent | A. S. T. M. Pour Point, °F. | S. O. D. Pour Stability Cycle A, Solid Point, °F. |
|---|---|---|
| 0 | +30 | +20 |
| 0.2 | −15 | −20 |
| 0.25 | −25 | |
| 0.5 | −35 | |
| 1.0 | −30 | |

EXAMPLE 4

Example 1 was repeated using chloroform as the solvent. This resulted in a lower temperature of reaction (67–75° C.). Refluxing was continued for four hours after the addition of the catalyst had been completed.

The product (126 g.) was dark brown. The analyses (73.10% C 10.46% H) indicated a copolymer in which the molar ratio of maleic anhydride units to octadecene units was about 1.25. Blends in lubricating oils gave the following results:

TABLE IV

| Conc. per cent | In Test Oil A | | In Test Oil B, A. S. T. M. Pour Pt., °F. |
|---|---|---|---|
| | A. S. T. M. Pour Pt., °F. | S. O. D. Pour Stability Cycle A, Solid Pt., °F. | |
| 0 | +30 | +20 | +15 |
| 0.05 | +30 | 0 | |
| 0.1 | +30 | −20 | |
| 0.2 | +20 | −20 | |
| 0.25 | −10 | | −10 |
| 0.5 | −25 | | −15 |
| 1.0 | −25 | | −10 |

EXAMPLE 5

Example 2 was repeated using chloroform as the solvent. The product (150 g.) was a light brown viscous fluid. The analyses (75.01% C, 10.01% H) indicates the maleic anhydride and octadecene copolymerized at a molar ratio of about 1.2.

The product was blended with lubricating oil and the following pour point data were obtained:

TABLE V

| Conc. per cent | In Test Oil A | | In Test Oil B, A. S. T. M. Pour Pt., °F. |
|---|---|---|---|
| | A. S. T. M. Pour Pt. °F. | S. O. D. Pour Stability Cycle A, Solid Pt., °F. | |
| 0 | +30 | +20 | +15 |
| 0.05 | +30 | 0 | |
| 0.1 | +30 | −20 | |
| 0.2 | +20 | −20 | |
| 0.25 | −10 | | −10 |
| 0.5 | −25 | | −15 |
| 1.0 | −25 | | −10 |

EXAMPLE 6

Example 1 was repeated using ethyl ether (350 ml.) as the solvent. The reaction temperature was 42° C. Refluxing was continued 20 hours after the catalyst had been added. The product (107 g.) was a reddish-brown brittle solid. Analyses (75.15% C, 11.60% H) indicated that the maleic anhydride and octadecene copolymerized at a molar ratio of about 1.3.

TABLE VI

| Conc. per cent | In Test Oil A | | In Test Oil B, A. S. T. M. Pour Pt., °F. |
|---|---|---|---|
| | A. S. T. M. Pour Pt. °F. | S. O. D. Pour Stability Cycle A, Solid Pt., °F. | |
| 0 | +30 | +20 | +15 |
| 0.05 | +30 | 0 | |
| 0.1 | +30 | −20 | |
| 0.2 | +20 | −20 | |
| 0.25 | −10 | | −10 |
| 0.5 | −25 | | −15 |
| 1.0 | −25 | | −10 |

EXAMPLE 7

Example 2 was repeated using ether (600 ml.) as the solvent. Refluxing was continued for twenty hours after the completion of the catalyst addition. The product (148 g.) was a brittle amber colored solid. The analyses (74.16% C, 10.87% H) indicated that the maleic anhydride and octadecene copolymerized in a molar ratio of about 1.1.

TABLE VII

| Conc. Per Cent | In Test Oil A, A.S.T.M. Pour Pt., °F. | In Test Oil B, A.S.T.M. Pour Pt., °F. |
|---|---|---|
| 0 | +30 | +15 |
| ¼ | 0 | −10 |
| ½ | −20 | −15 |
| 1 | −20 | −15 |

EXAMPLE 8

A flask was charged with 49 g. of maleic anhydride, 126 g. of octadecene, 155 ml. of benzene and 0.09 of ferric laurate. Two solutions were prepared, one by dissolving 3 g. of benzoyl peroxide in 60 ml. of benzene and the other by dissolving 3.7 g. of benzoin in 60 ml. of benzene. The flask was heated to boiling and 10 ml. of each of the two solutions were added. Each hour another 10 ml. of benzoin solution and 10 ml. of benzoyl peroxide were added until all had been added. Refluxing was continued for an hour after the addition of catalyst had been completed. Solvent was removed by heating the product to 200° C. at atmospheric pressure and then to the same temperature at 1-2 mm. pressure. The product (118 g.) was a brown brittle solid. Analyses (71.76% C and 10.17% H) indicated that the maleic anhydride and octadecene copolymerized at a molar ratio of about 1.4.

The product was blended with lubricating oils and the following pour point data were obtained:

TABLE VIII

| Conc. per cent | In Test Oil A | | | In Test Oil B, A.S.T.M. Pour Pt. °F. |
|---|---|---|---|---|
| | A.S.T.M. Pour Pt. °F. | S.O.D. Pour Stability Cycle A, Solid Pt., °F. | | |
| 0 | +30 | +20 | | +15 |
| 0.05 | +30 | −10 | | |
| 0.1 | +30 | −15 | | |
| 0.2 | +30 | −20 | | |
| 0.25 | +30 | | | −10 |
| 0.5 | −10 | | | −15 |
| 1.0 | −35 | | | −10 |

EXAMPLE 9

Experiment 1 was repeated using 1-hexadecene in place of the 1-octadecene. The residue was an amber colored brittle solid. Analyses (72.58% C and 9.79% H) indicated that the maleic anhydride and hexadecene copolymerized at a molar ratio of about 1.3.

The product was found to be soluble in Test oil A but did not lower the pour point when present to the extent of 1%. However, it may impart other beneficial properties to the oil such as detergency and it can be converted to a pour depressant by esterification, etc.

EXAMPLE 10

Example 1 was repeated using 1-tetradecene in place of 1-octadecene. The product (127 g.) was a brittle amber colored solid. Analyses (71.23% C, 9.52% H) indicated that the maleic anhydride and tetradecene copolymerized at a molar ratio of about 1.3. The product was found to be soluble in Test oil A but did not lower the pour point when present to the extent of 1%. However, it might impart other beneficial properties to the oil such as detergency and it can be converted to a pour depressant by esterification, etc.

EXAMPLE 11

Example 1 was repeated using 1-dodecene in place of the 1-octadecene. The product (118 g.) was a brittle solid at room temperature. Analyses (72.98% C, 10.29% H) indicated that the maleic anhydride and dodecene copolymerized at a molar ratio of about 0.9. The product was not soluble in Test oil A to the extent of 1%.

EXAMPLE 12

Example 1 was repeated using 1-decene in place of the 1-octadecene. The product (105 g.) was a brittle, light amber colored solid. Analyses (71.83% C, 9.82% H) indicated that the maleic anhydride and decene copolymerized at a molar ratio of about 0.9. The product was only slightly soluble, less than 1%, in Test oil A.

EXAMPLE 13

Citraconic anhydride (56 g.), 1-octadecene (126 g.) and benzene (200 cc.) were mixed in a flask and heated to refluxing. Benzoyl peroxide (1½ g.) in benzene (30 cc.) was added in six equal portions at hourly intervals while the mixture was maintained at the boiling temperature. The mixture was allowed to reflux for 1½ hours after the last portion of catalysts was added. Benzene was then removed by distillation, heating to a pot temperature of 200° C. Distillation was continued at reduced pressure finally heating to 200° C. at 1 to 2 mm. pressure. The residue (31 g.) was a viscous, clear, amber colored fluid that became quite solid at room temperature. It was blended with lubricating oil and the following data were obtained.

TABLE IX

*Blends in lubricating oil*

| Conc., Per Cent | In Oil A, Pour Pt., °F. | In Oil B, Pour Pt., °F. |
|---|---|---|
| 0 | +30 | +5 |
| ¼ | +30 | −15 |
| ½ | +30 | −25 |
| 1 | −30 | −25 |

EXAMPLE 14

Itaconic acid (65 g.), 1-octadecene (126 g.) and benzene (700 cc.) were mixed in a flask and refluxed. The itaconic acid did not completely dissolve. Benzoyl peroxide (1½ g.) was dissolved in benzene (30 cc.) and the solution was added to the boiling reaction mixture in six equal portions at hourly intervals. The refluxing was continued for an hour after the last addition of catalyst. Upon cooling considerable precipitate separated. This was filtered off, washed with benzene and air dried. The white solid (64 g.) was found to be unchanged itaconic acid. The filtrate was concentrated by distillation heating to 200° at 1-2 mm. pressure. The distillate (121 g.) was unchanged 1-octadecene. The residue (7 g.) was a light yellow rather viscous fluid. The analyses (80.65% C, 12.41% H) of the product indicated a copolymer in which 3 mols of 1-octadecene copolymerized with one mol of itaconic acid. However, it is believed that the product is a mixture of copolymer and unreacted 1-octadecene in which the copolymer has been formed by the reaction of one mol of itaconic acid with one mol 1-octadecene.

The product was tested as a pour depressant for lubricating oil and the following data obtained:

TABLE X

*Blends in lubricating oil*

| Conc., Per Cent | In Oil A, Pour Pt., °F. |
|---|---|
| 0 | +30 |
| ¼ | 0 |
| ½ | −10 |
| 1 | −10 |

EXAMPLE 15

Itaconic anhydride (56 g.), 1-octadecene (126 g.) and benzene (200 cc.) were mixed in a flask and heated to refluxing. Benzoyl peroxide (1½ g.) was dissolved in benzene (30 cc.) and then was added to the refluxing mixture in six equal portions at hourly intervals. Refluxing was continued for one hour after the last addition of catalyst. A precipitate separated during the reaction period. After cooling, the mixture was filtered and the precipitate was washed with benzene and air dried. It was a white powder (42 g.) that did not melt at 200° C. Analyses (58.03% C, 5.40% H) indicated that this product is a copolymer of itaconic anhydride and 1-octadecene in a mol ratio of about 14:1, i. e., predominantly polyitaconic anhydride.

The filtrate was concentrated by distillation finally heating to 200° at 1–2 mm. pressure. Considerable octadecene (103 g.) was recovered as a distillate. The residue (40 g.) was an amber colored brittle solid. Analyses (C=73.07%, H=10.68%) indicated that this product is a copolymer in which the mol ratio of the monomers, itaconic anhydride and octadecene, is 1.5. This product was oil soluble and has properties of a pour depressant as indicated below.

TABLE XI

*Blends in lubricating oil*

| | In Oil A | In Oil B, Pour Pt., °F. |
|---|---|---|
| Conc., Per Cent | Pour Pt., °F. | |
| 0 | +30 | +5 |
| ¼ | +5 | −10 |
| ½ | −15 | −10 |
| 1 | −25 | −10 |

EXAMPLE 16

Chloromaleic anhydride (66.3 g.), 1-octadecene (126 g.) and benzene (100 ml.) were heated to boiling (105° C.). Benzoyl peroxide (1½ g.) was dissolved in benzene (30 ml.) and the solution was added to the refluxing mixture in six equal portions at hourly intervals. Refluxing was continued for one hour after the last addition, then benzene was distilled until the pot temperature reached 160° C. The product was concentrated further by heating to 200° C. at 1–2 mm. pressure. There was evidence of some hydrogen chloride splitting out at this temperature. The residue (134 g.) was an amber colored viscous fluid. Analyses of the product follow.

| Found | Calculated for $C_{22}H_{37}O_3Cl$ |
|---|---|
| C = 73.15% | C = 68.63 |
| H = 10.01% | H = 9.69 |
| Cl = 4.13% | Cl = 9.21 |

The low chlorine is due, no doubt, to the decomposition during the isolation of the product as mentioned above. The product was blended with lubricating oils and the following data were obtained:

TABLE XII

*Blends in lubricating oil*

| | In Oil A | In Oil B, Pour Pt., °F. |
|---|---|---|
| Conc., Per Cent | Pour Pt., °F. | |
| 0 | +30 | +5 |
| ¼ | −10 | −10 |
| ½ | −35 | −10 |
| 1 | −35 | −5 |

It is further within the contemplation of the invention that the copolymers may be neutralized by reacting with an alcohol, a primary or secondary amine or with a metal to obtain an esterified, amidized or imidized product or a metallic salt.

What is claimed is:

A composition consisting essentially of a major proportion of an oil base stock and from 0.01 to 10% by weight of a product consisting essentially of a copolymer of maleic anhydride and octadecene, said copolymer being formed by condensing from 1 to 4 mols of the said octadecene with 1 mol of the said anhydride in the presence of benzoyl peroxide catalyst at a temperature of from 100° C. to 200° C. at atmospheric pressure.

SAMUEL B. LIPPINCOTT.
LOUIS A. MIKESKA.

REFERENCES CITED

The following references are of record in the file of this patent:

UNITED STATES PATENTS

| Number | Name | Date |
|---|---|---|
| 2,055,456 | Eichwald | Sept. 22, 1936 |
| 2,133,734 | Moser | Oct. 18, 1938 |
| 2,168,535 | Nusslein | Aug. 8, 1939 |
| 2,366,517 | Gleason | Jan. 2, 1945 |
| 2,370,943 | Dietrich | Mar. 6, 1945 |
| 2,378,629 | Hanford | June 19, 1945 |
| 2,380,304 | Gleason | July 10, 1945 |
| 2,422,278 | Young | June 17, 1947 |